No. 738,233. PATENTED SEPT. 8, 1903.
H. PATTBERG.
CONTRIVANCE FOR ACTUATING SHAFT BORERS.
APPLICATION FILED NOV. 5, 1901.
NO MODEL. 3 SHEETS—SHEET 1.

No. 738,233. PATENTED SEPT. 8, 1903.
H. PATTBERG.
CONTRIVANCE FOR ACTUATING SHAFT BORERS.
APPLICATION FILED NOV. 5, 1901.
NO MODEL. 3 SHEETS—SHEET 2.

Witnesses:
Arthur Young
Edward Ray

Inventor:
Heinrich Pattberg
by his attorneys
Roeder & Briesen

No. 738,233. PATENTED SEPT. 8, 1903.
H. PATTBERG.
CONTRIVANCE FOR ACTUATING SHAFT BORERS.
APPLICATION FILED NOV. 5, 1901.
NO MODEL. 3 SHEETS—SHEET 3.
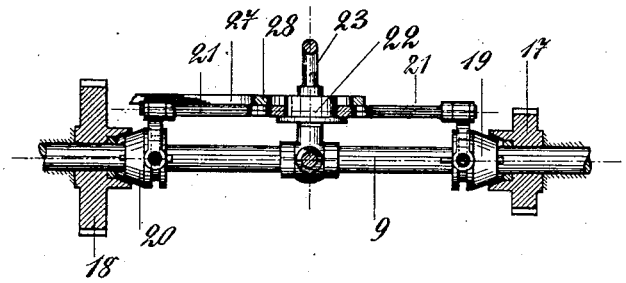
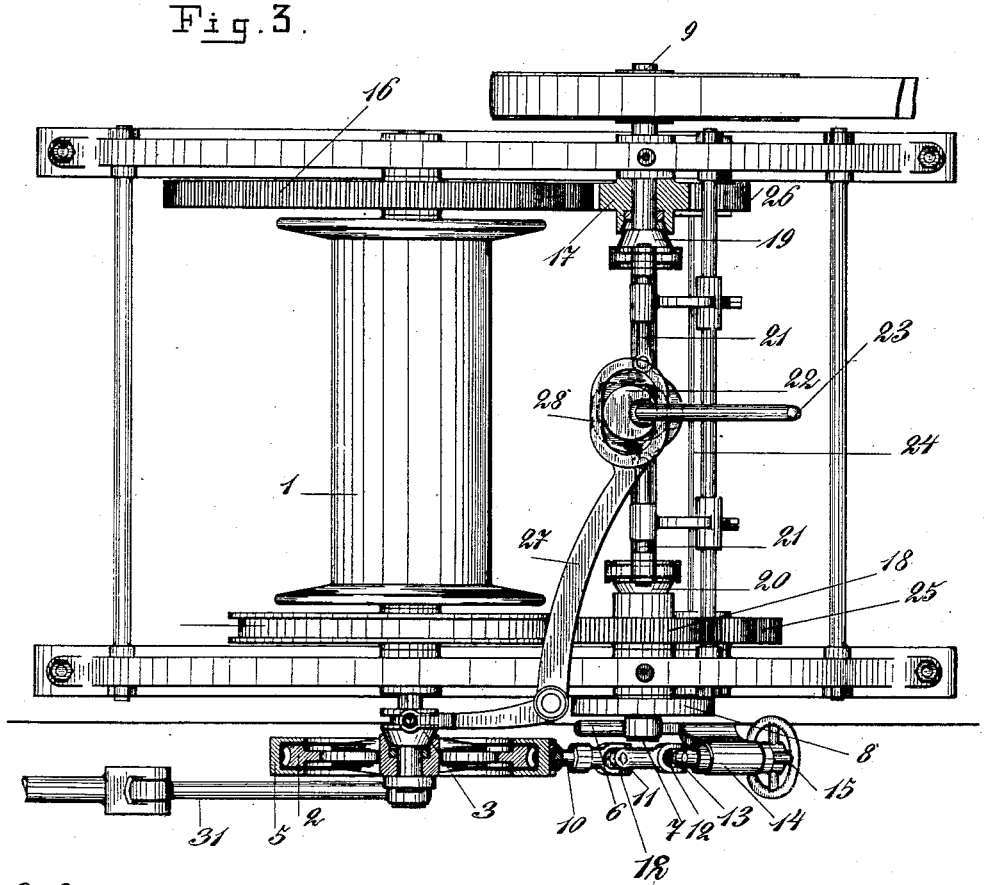

No. 738,233.  
Patented September 8, 1903.

UNITED STATES PATENT OFFICE.

HEINRICH PATTBERG, OF HOMBURG-ON-THE-RHINE, GERMANY.

CONTRIVANCE FOR ACTUATING SHAFT-BORERS.

SPECIFICATION forming part of Letters Patent No. 738,233, dated September 8, 1903.

Application filed November 5, 1901. Serial No. 81,187. (No model.)

*To all whom it may concern:*

Be it known that I, HEINRICH PATTBERG, a citizen of Germany, and a resident of Homburg-on-the-Rhine, Germany, have invented certain new and useful Improvements in Contrivances for Actuating Shaft-Borers, of which the following is a specification.

The accompanying drawings illustrate a contrivance by which the shaft-borer is raised and lowered and the rope paid out by means of a unique arrangement.

Figure 1:
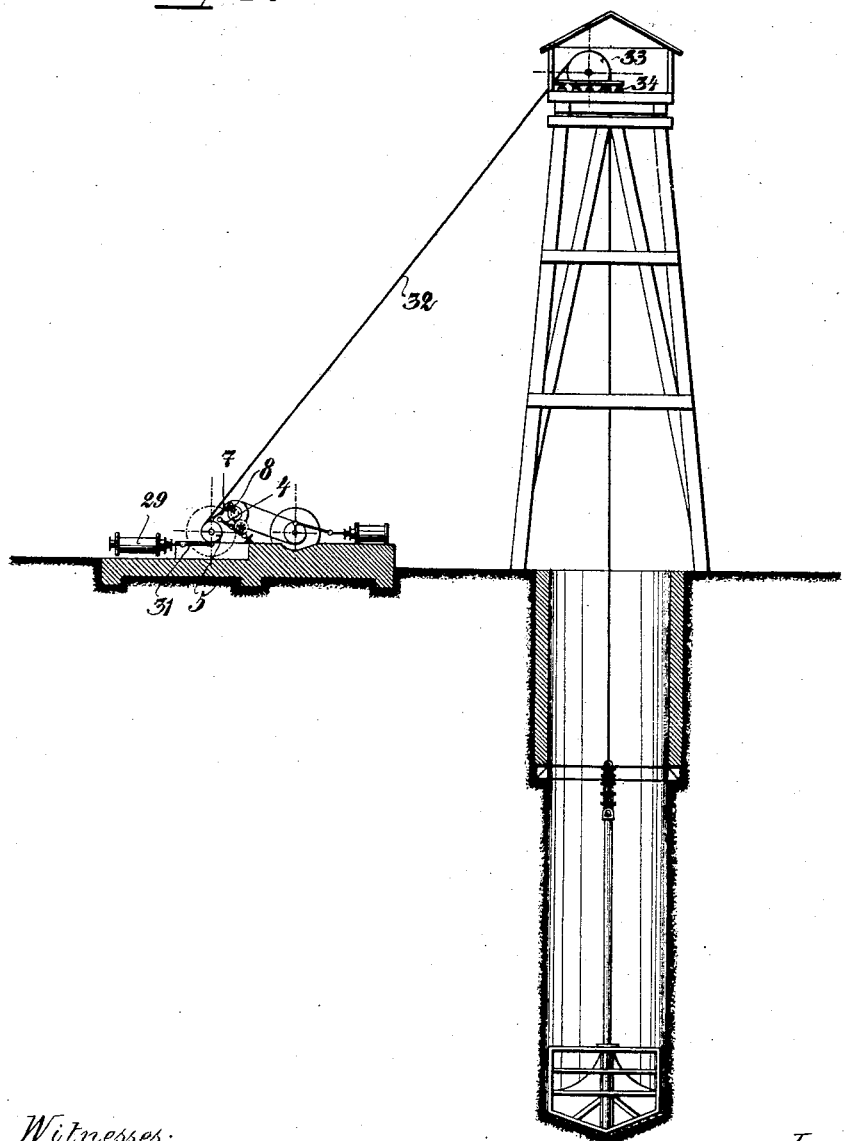
Figure 2:
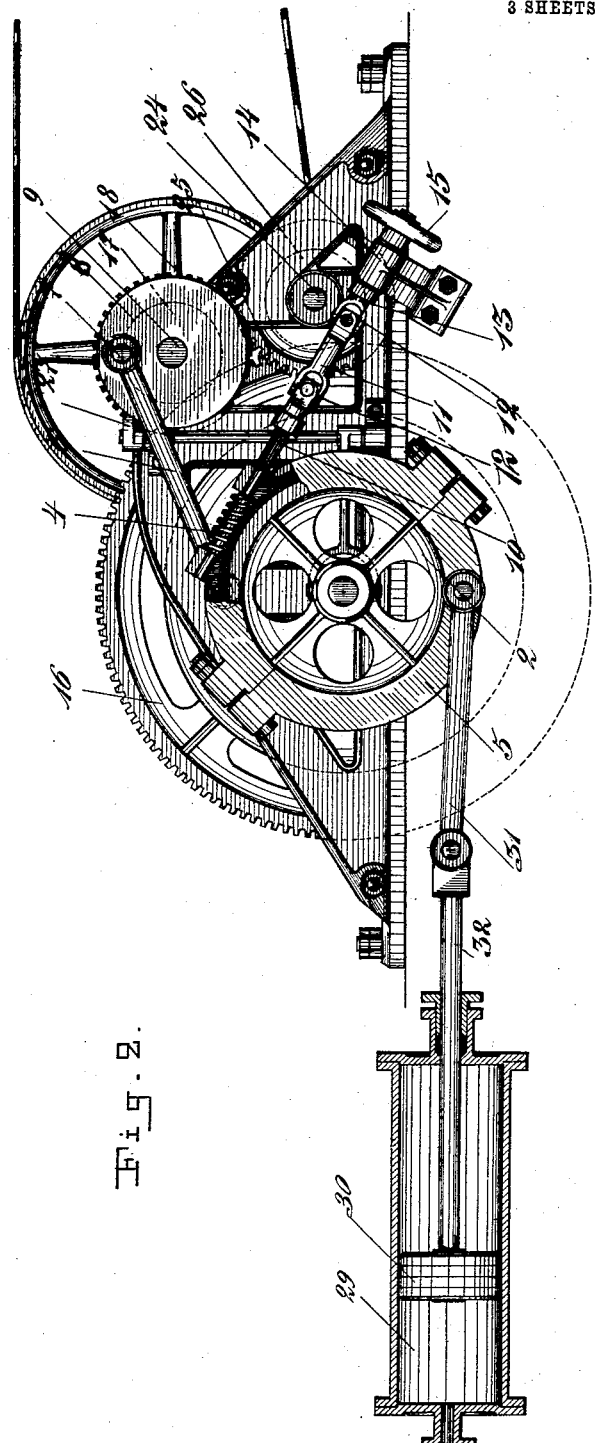

Figure 1 is a sectional elevation of the entire contrivance; Fig. 2, a side view, partly broken away; Fig. 3, a plan, and Fig. 4 a rear view of the actuating contrivance.

The drum 1 is firmly connected to an axle, which is rotatable in the frame of the machine in a suitable manner. Upon said axle is loosely mounted a worm-wheel 2, that may be coupled to said axle by a friction-clutch 3. The worm-wheel 2 is operated by a worm 4, resting in two bearings, which are secured to a ring 5. This ring consists of two semicircular parts which are bolted together. The ring has two side flanges, so as to embrace the worm-wheel 2 and to be rotatable around the same. One end of a connecting rod or pitman 6 is pivoted to said ring, the other end of rod 6 engaging the crank 7 of disk 8. The latter is secured to a shaft 9, which is to be rotated by a belt or other suitable means. The worm 4 terminates at its rear end in a shaft 10, which is telescoped by a hollow shaft 11. The shafts 10 and 11 are provided with pin and groove, so that they can only move axially, and an independent turning is prevented. The hollow shaft 11 is connected to a shaft 13 by a drag-bar and two universal joints. The shaft 13, provided with a hand-wheel 15, is rotatable in a bearing 14.

Upon the axle of drum 1 is firmly mounted a toothed wheel 16, engaging two toothed wheels 17 and 26. The wheel 17 is loosely mounted upon the shaft 9, while the wheel 26 is fixed upon a shaft 24. The shaft 24 carries the fixed toothed wheel 25, which intergears with the toothed wheel 18, loosely mounted upon shaft 9. Either of the toothed wheels 17 and 18 may be coupled with the shaft 9 by means of friction-clutches 19 and 20, respectively, which are so constructed that while one is in engagement the other is out of engagement. These clutches are operated by an eccentric 22 and connecting-rods 21, the eccentric being operated by a hand-lever 23. The eccentric 22 is further embraced by a strap 28, connected to one arm of an angular lever 27. The other arm of said lever engages the friction-clutch 3, which is so constructed that while the lever 23 is in its central position the clutch 3 is in engagement. At the extreme right and left positions of lever 23 one of the clutches 19 or 20 will be thrown into engagement with the toothed wheels 17 or 18, while the clutch 3 will be out of engagement with the worm-wheel 2.

In order to avoid shocks caused by the oscillating motion of drum 1, I provide a pressure-cylinder 29, having a piston 30, which is connected to the ring 5 by a piston-rod 32 and a pitman 31. The cylinder 29 may be furnished with any pressing medium by pipe 33.

The operation is as follows: In order to cause an upward and downward motion of the rope and of the shaft-borer to bore the hole, the drum 1, to which the rope is attached, receives an oscillating motion in the following manner: The hand-lever 23 is turned to its central position, so that clutches 19 and 20 are inoperative while clutch 3 is in engagement. The ring 5 receives an oscillating motion from shaft 9 by crank 7 and connecting-rod 6. This motion is transferred to the drum by worm 4, worm-wheel 2, and clutch 3. When the borer has advanced farther into the shaft or bore hole, the rope is to be paid out a little. For this purpose hand-wheel 15 is turned, so that worm-wheel 2, and with it drum 1, is turned relatively to the ring 5 by means of worm 4. It may be easily understood that in this way the rope may be wound off and on while the machine is operating—*i. e.*, while drum 1 is oscillating. If the borer is to be raised or lowered rapidly, the hand-lever is turned into its right or left extreme position. In this way clutch 3 is out of engagement, so that drum 1 receives no oscillating motion. If lever 23 is turned to the right, clutch 20 will be operated, so that drum 1 receives motion from shaft 9 by toothed wheels 18 25, shaft 24, and toothed wheel 26. If lever 23 is turned to the left, clutch 19 will be operated, so that drum 1 receives motion in the opposite direction from shaft 9 by toothed wheel 17.

What I claim is—

1. In an apparatus for actuating shaft-borers, a drum, a worm-wheel mounted loosely on the drum-shaft, an intervening clutch, an oscillating ring having bearings, and a worm rotatable in said bearings and engaging the worm-wheel, substantially as specified.

2. In an apparatus for actuating shaft-borers, a drum, a worm-wheel mounted loosely on the drum-shaft, an intervening clutch, an oscillating ring having bearings, a worm rotatable in said bearings and engaging the worm-wheel, a hollow shaft embracing the worm-shaft, means for guiding the worm-shaft axially within the hollow shaft, and a handle pivoted to the hollow shaft, substantially as specified.

3. In an apparatus for actuating shaft-borers, a drum, a worm-wheel mounted loosely on the drum-shaft, an intervening clutch, an oscillating ring having bearings, a worm rotatable in said bearings and engaging the worm-wheel, a gear and a reversing-gear adapted to engage the drum, and a lever for operating said gears and the clutch, substantially as specified.

4. In an apparatus for actuating shaft-borers, a drum, a worm-wheel mounted loosely on the drum-shaft, an intervening clutch, an oscillating ring having bearings, a worm rotatable in said bearings and engaging the worm-wheel, a hollow shaft embracing the worm-shaft, means for guiding the worm-shaft axially within the hollow shaft, a handle pivoted to the hollow shaft, a gear and a reversing-gear adapted to engage the drum, and a lever for operating said gears and the clutch, substantially as specified.

Signed by me at Dusseldorf, Germany, this 23d day of October, 1901.

HEINRICH PATTBERG.

Witnesses:
WM. ESSENWIEN,
P. LIEBER.